United States Patent
Nitta (10) Patent No.: US 10,177,426 B2
(45) Date of Patent: Jan. 8, 2019

(54) AIR BATTERY

(71) Applicant: Toyota Jidosha Kabushiki Kaisha, Toyota-shi, Aichi-ken (JP)

(72) Inventor: Iwao Nitta, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 398 days.

(21) Appl. No.: 14/879,766

(22) Filed: Oct. 9, 2015

(65) Prior Publication Data

US 2016/0104926 A1    Apr. 14, 2016

(30) Foreign Application Priority Data

Oct. 9, 2014    (JP) .................. 2014-208364

(51) Int. Cl.
| | | |
|---|---|---|
| *H01M 12/08* | (2006.01) | |
| *H01M 4/90* | (2006.01) | |
| H01M 4/86 | (2006.01) | |
| H01M 12/04 | (2006.01) | |
| H01M 12/06 | (2006.01) | |
| H01M 12/02 | (2006.01) | |

(52) U.S. Cl.
CPC .......... *H01M 12/08* (2013.01); *H01M 4/9016* (2013.01); *H01M 12/02* (2013.01); *H01M 12/04* (2013.01); *H01M 12/06* (2013.01); *H01M 2004/8689* (2013.01); *Y02E 60/128* (2013.01)

(58) Field of Classification Search
CPC ......... H01M 12/08; H01M 2004/8689; H01M 4/9016; H01M 12/02; H01M 12/04; H01M 12/06; Y02E 60/128
See application file for complete search history.

(56) References Cited

U.S. PATENT DOCUMENTS

| | | | |
|---|---|---|---|
| 2005/0226798 A1* | 10/2005 | Bulow .................. | B01D 53/02 423/263 |
| 2012/0040254 A1* | 2/2012 | Amendola ............ | C25B 11/035 429/406 |
| 2014/0127595 A1 | 5/2014 | Hirose | |
| 2015/0010833 A1* | 1/2015 | Amendola .......... | H01M 4/8647 429/406 |

FOREIGN PATENT DOCUMENTS

| | | |
|---|---|---|
| JP | 2009-518795 A | 5/2009 |
| JP | 2014-093227 A | 5/2014 |
| WO | 2007065899 A1 | 6/2007 |

* cited by examiner

*Primary Examiner* — Ula C Ruddock
*Assistant Examiner* — Matthew W Van Oudenaren
(74) *Attorney, Agent, or Firm* — Dinsmore & Shohl LLP (57) ABSTRACT

An air battery includes a negative electrode, an air electrode, and an electrolyte that is interposed between the negative electrode and the air electrode. The air electrode includes: an oxygen evolution reaction layer for charging that is provided on an electrolyte side of the air electrode and contains an oxygen evolution reaction catalyst containing no carbon; an oxygen reduction reaction layer for discharging that is provided on an opposite side of the air electrode from the electrolyte and contains an oxygen reduction reaction catalyst containing carbon; and a current collector that is provided between the oxygen evolution reaction layer and the oxygen reduction reaction layer or in the oxygen evolution reaction layer.

6 Claims, 6 Drawing Sheets

AIR BATTERY

INCORPORATION BY REFERENCE

The disclosure of Japanese Patent Application No. 2014-208364 filed on Oct. 9, 2014 including the specification, drawings and abstract is incorporated herein by reference in its entirety.

BACKGROUND OF THE INVENTION

1. Field of the Invention

The present invention relates to an air battery.

2. Description of Related Art

An air battery is known as means for storing and efficiently using electric energy. In the air battery, it is not necessary to arrange a positive electrode active material in a battery case, and a negative electrode active material can be arranged in most of the internal region of the battery case. Therefore, the air battery has a characteristic in that, in principle, high energy density can be obtained. That is, the air battery can realize high capacity and thus has attracted much attention.

In an air electrode of the air battery, a catalyst which oxidizes and reduces oxygen is used. As the air electrode of the air battery, for example, Japanese Patent Application Publication No. 2014-93227 (JP 2014-93227 A) discloses an air electrode for an air battery. This air electrode for an air battery contains at least a conductive material and an inorganic fluoride in addition to a catalyst for an air battery. For example, a perovskite type oxide containing transition metal is used as the catalyst for an air electrode, and a carbon material is used as the conductive material.

In order to use the air battery as a rechargeable secondary battery, for example, a method of using an air electrode during discharging and using an auxiliary charging electrode during charging may be used. However, in this case, the advantageous effect that it is not necessary to arrange a positive electrode active material in a battery case deteriorates due to the arrangement of the auxiliary charging electrode. Therefore, a technique capable of charging and discharging using one air electrode without using an auxiliary charging electrode is desired.

In the air battery disclosed in JP 2014-93227 A, for example, a combination of materials including a specific perovskite type oxide, a carbon material, and an inorganic fluoride is selected, and an air electrode formed of this combination of materials is used. When an air battery is charged and discharged using one air electrode, there is no problem in the air electrode during discharging; however, the carbon material of the air electrode may be oxidized and decomposed during charging, that is, during an oxygen evolution reaction. As a result, catalytic activity and output characteristics deteriorate. In an air battery capable of charging and discharging using one air electrode without using an auxiliary charging electrode, a technique capable of stably improving output characteristics is desired.

SUMMARY OF THE INVENTION

According to an aspect of the invention, there is provided an air battery including: a negative electrode; an air electrode; and an electrolyte that is interposed between the negative electrode and the air electrode, in which the air electrode includes an oxygen evolution reaction layer for charging that is provided on an electrolyte side of the air electrode and contains an oxygen evolution reaction catalyst containing no carbon, an oxygen reduction reaction layer for discharging that is provided on an opposite side of the air electrode from the electrolyte and contains an oxygen reduction reaction catalyst containing carbon, and a current collector that is provided between the oxygen evolution reaction layer and the oxygen reduction reaction layer or in the oxygen evolution reaction layer.

According to the invention, output characteristics can be stably improved in an air battery capable of charging and discharging using one air electrode without using an auxiliary charging electrode.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

According to an embodiment of the invention, there is provided an air battery including: a negative electrode; an air electrode; and an electrolyte that is interposed between the negative electrode and the air electrode, in which the air electrode includes an oxygen evolution reaction layer for charging that is provided on an electrolyte side of the air electrode and contains an oxygen evolution reaction catalyst containing no carbon, an oxygen reduction reaction layer for discharging that is provided on an opposite side of the air electrode from the electrolyte and contains an oxygen reduction reaction catalyst containing carbon, and a current collector that is provided between the oxygen evolution reaction layer and the oxygen reduction reaction layer or in the oxygen evolution reaction layer.

In the air battery according to the embodiment (hereinafter, also referred to as "present air battery"), one air electrode includes: a portion that mainly functions as a charging electrode; and a portion that mainly functions as a discharging electrode. That is, it is not necessary to separately arrange an auxiliary charging electrode in the air battery. As a result, an internal region of the air battery can be effectively utilized, and energy density can be improved. In this case, the portion that mainly functions as a charging electrode is an oxygen evolution reaction layer (OERL) which contains an electrode catalyst for a charge reaction, that is, for an oxygen evolution reaction. On the other hand, the portion that mainly functions as a discharging electrode is an oxygen reduction reaction layer (ORRL) which contains an electrode catalyst for a discharge reaction, that is, for an oxygen reduction reaction.

In addition, in the present air battery, the oxygen evolution reaction layer which is the electrode catalyst for charging is arranged on an electrolyte side of the air electrode. That is, the oxygen evolution reaction layer is arranged on a side closer to the electrolyte than the oxygen reduction reaction layer which is the electrode catalyst for discharging. Therefore, $OH^-$ used in the oxygen evolution reaction ($4OH^- \rightarrow O_2+2H_2O+4e^-$) during charging can be easily supplied from the electrolyte to the oxygen evolution reaction layer. Accordingly, the oxygen evolution reaction can be caused to preferentially occur on the oxygen evolution reaction layer where the oxygen evolution reaction is efficiently promoted. As a result, the oxygen evolution reaction is efficiently promoted, and output characteristics can be improved.

In the present air battery, the oxygen reduction reaction layer for discharging is arranged on an opposite side of the air electrode from the electrolyte. That is, the oxygen reduction reaction layer is arranged on the side facing the atmosphere (air) or an oxygen supply path. Therefore, oxygen used in the oxygen reduction reaction ($O_2+2H_2O+4e^- \rightarrow 4OH^-$) during discharging can be easily supplied from the atmosphere or the oxygen supply path to the oxygen reduction reaction layer. Accordingly, the oxygen reduction reaction can be caused to preferentially occur on the oxygen reduction reaction layer where the oxygen reduction reaction is efficiently promoted. As a result, even when a high current is caused to flow, an increase in concentration overvoltage can be suppressed without being limited by oxygen transfer. Therefore, the oxygen reduction reaction is efficiently promoted, and output characteristics can be improved.

In the present air battery, the oxygen evolution reaction layer does not contain carbon, the oxygen reduction reaction layer contains carbon, and the current collector is arranged between the oxygen evolution reaction layer and the oxygen reduction reaction layer or in the oxygen evolution reaction layer. For example, when the oxygen evolution reaction layer or the oxygen reduction reaction layer contains carbon as a support, in the oxygen evolution reaction in the air electrode during charging, that is, in the oxidation reaction, the support carbon may be decomposed by a reaction intermediate during the oxidation reaction or may deteriorate due to an oxidation potential. Accordingly, in the present air battery, in order to suppress the oxidative deterioration of the air electrode during charging, a catalyst containing no carbon is used as the oxygen evolution reaction layer for charging, and the application of an oxidation potential to the oxygen reduction reaction layer (containing carbon) is prevented. In order not to apply an oxidation potential to the oxygen reduction reaction layer, it is necessary to prevent electrons from flowing to the oxygen reduction reaction layer during charging, that is, to arrange the current collector between the oxygen evolution reaction layer and the oxygen reduction reaction layer or in the oxygen evolution reaction layer. As a result, even when an oxidation potential is applied to the oxygen evolution reaction layer during charging, performance deterioration caused by the decomposition or deterioration of the support carbon does not occur because the support does not contain carbon. On the other hand, in the oxygen reduction reaction layer, even when a catalyst containing a support carbon is used, an oxidation potential is not applied thereto. Therefore, the decomposition or deterioration of the support carbon does not occur, and performance deterioration does not occur. With the above-described configuration, during charging and discharging, deterioration of the oxygen evolution reaction layer and the oxygen reduction reaction layer of the air electrode can be suppressed. The reason why the catalyst containing the support carbon is used in the oxygen reduction reaction layer will be described below.

As described above, in the present air battery, the oxidation decomposition of the carbon material in the air electrode during charging is suppressed, and thus output characteristics are improved. Moreover, in the present air battery, both functions (activities) of charging and discharging can be realized using one air electrode. As a result, the air battery can be used as a secondary battery without providing an auxiliary charging electrode in the air battery. Since the auxiliary charging electrode is not provided, the energy density can be improved correspondingly.

Hereinafter, the air battery (present air battery) according to the embodiment will be described in detail.

Figure 1:
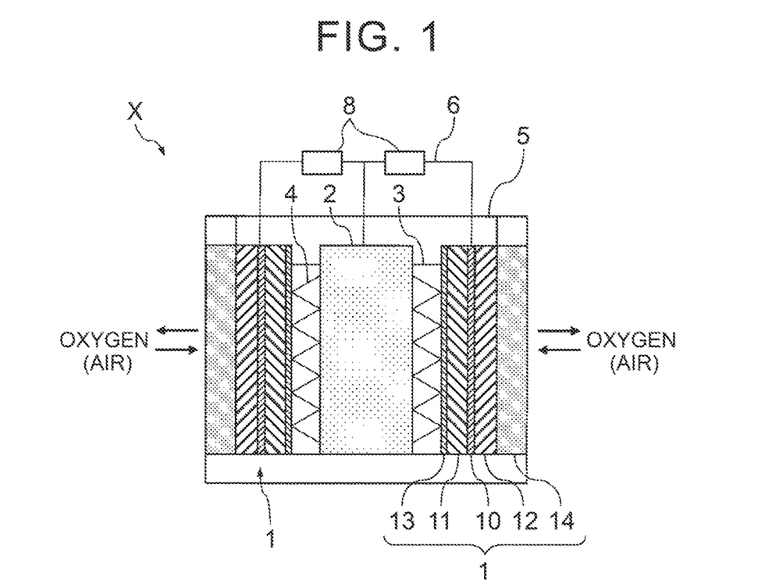
FIG. 1 is a side view schematically showing a configuration example of an air battery according to an embodiment of the invention.

FIG. 1 is a side view schematically showing a configuration example of the air battery according to the embodiment of the invention. In the air battery X, oxygen in air is used as a positive electrode active material, and metal is used as a negative electrode active material. The air battery X is rechargeable and can be used as a secondary battery. The air battery X is provided in a battery case 5 and includes an air electrode 1, a negative electrode 2, and an electrolyte 3 that is interposed between the negative electrode 2 and the air electrode 1. Here, in FIG. 1, two air electrodes 1 are provided on both sides of the negative electrode 2, respectively. However, since the air electrodes 1 on both the sides are the same, only one air electrode 1 will be described. The air electrode 1 may be provided only on one side of the negative electrode 2.

The air electrode 1 is a positive electrode of the air battery X which is a secondary battery. The air electrode 1 includes: an oxygen evolution reaction layer 11 that is provided on an electrolyte side of the air electrode 1; an oxygen reduction reaction layer 12 that is provided on an opposite side of the air electrode 1 from the electrolyte; and a current collector 10 that is provided between the oxygen evolution reaction layer 11 and the oxygen reduction reaction layer 12.

The oxygen evolution reaction layer 11 is an electrode catalyst that is mainly used during the charging of the air battery X, that is, during an oxygen evolution reaction. The oxygen evolution reaction layer 11 is formed as a catalyst containing no carbon. The reason for containing no carbon is as follows: since carbon is easily oxidized and decomposed, a catalyst containing carbon is oxidized and decomposed during the oxygen evolution reaction. It is preferable that the oxygen evolution reaction layer 11 has high oxygen evolution activity and high oxidation potential resistance, and it is more preferable that the oxygen evolution reaction layer 11 has a high specific surface area from the viewpoint of further improving oxygen evolution activity. Examples of the catalyst include catalysts having the above-described characteristics and containing no carbon, for example, a perovskite type oxide catalyst, a spinel type oxide catalyst, a pyrochlore type oxide catalyst, and a catalyst of metal such as nickel or an alloy.

Examples of the perovskite type oxide catalyst include $La_{1-x}Sr_xFe_{1-y}Co_yO_3$ ($0<x<1$, $0<y<1$) containing La, Sr, Fe, Co, or O as a constituent element. From the viewpoints of obtaining higher oxygen evolution activity and durability, $0.6 \leq x < 1$ and $0.2 \leq y \leq 0.6$ are preferable, and $0.7 \leq x \leq 0.9$ and $0.3 \leq y \leq 0.5$ are more preferable. Among these, $La_{0.2}Sr_{0.8}Fe_{0.6}Co_{0.4}O_3$ in which, approximately, x=0.8 and y=0.4 is more preferable. Examples of the spinel type oxide catalyst include $CuCo_2O_4$ and $Co_3O_4$. Examples of the pyrochlore type oxide catalyst include $Bi_2Ir_2O_7$. In either case, this catalyst may contain an unavoidable impurity or a dopant which does not have adverse effects on the above-described characteristics.

It is preferable that the oxygen evolution reaction layer 11 is hydrophilized, that is, is hydrophilic. When the oxygen evolution reaction layer 11 is hydrophilized, $OH^-$ used in the charge reaction of the oxygen evolution reaction layer 11 can be efficiently transferred from the electrolyte 3 into the oxygen evolution reaction layer 11. Further, water used in the discharge reaction of the oxygen reduction reaction layer 12 can be efficiently supplied from the electrolyte 3 to the oxygen reduction reaction layer 12 through the oxygen evolution reaction layer 11. As a result, output characteristics of the air battery X can be improved. A method of hydrophilizing the oxygen evolution reaction layer 11 is not particularly limited, and examples thereof include a hydrophilic functional group treatment (introduction of a hydrophilic functional group) on a material of the oxygen evolution reaction layer 11 and a method of introducing a polymer, on which the hydrophilic functional group treatment is performed, into a material of the oxygen evolution reaction layer 11.

The oxygen reduction reaction layer 12 is an electrode catalyst that is mainly used during the discharging of the air battery X, that is, during an oxygen reduction reaction. The oxygen reduction reaction layer 12 is formed as a catalyst containing carbon as a support. The reason for containing carbon as a support is that carbon is essential for the oxygen reduction reaction. It is preferable that the oxygen reduction reaction layer 12 has high oxygen reduction activity, and it is more preferable that the oxygen reduction reaction layer 12 has a high specific surface area from the viewpoint of further improving oxygen reduction activity. Examples of the catalyst include a perovskite type oxide catalyst having the above-described characteristics and containing carbon as a support.

Here, the reason why carbon is essential for the oxygen reduction reaction is as follows. As a result of investigation regarding the perovskite type oxide catalyst containing carbon as a support, the present inventors obtained the following findings. The oxygen reduction reaction in the electrode catalyst, that is, a four-electron reduction reaction ($O_2+2H_2O+4e^- \rightarrow 4OH^-$) is established through: a first two-electron reduction reaction ($O_2+H_2O+2e^- \rightarrow HO_2^- +OH^-$) which occurs first; and a second two-electron reduction reaction ($HO_2^- +H_2O+2e^- \rightarrow 3OH^-$) which occurs after the first two-electron reduction reaction. The first two-electron reduction reaction occurs mainly in the support carbon, and the second two-electron reduction reaction occurs mainly in the perovskite type oxide catalyst. Accordingly, when the support carbon deteriorates due to, for example, oxidation decomposition, the first two-electron reduction reaction is not sufficiently promoted, and thus the second two-electron reduction reaction is not sufficiently promoted. As a result, it is difficult to promote the oxygen reduction reaction. Accordingly, the support carbon is an essential component in the perovskite type oxide catalyst. Therefore, due to the support carbon, the four-electron reduction reaction can be efficiently promoted, and output can be improved.

Examples of the perovskite type oxide catalyst include $LaMnO_3$ that is formed on carbon as a support and contains La, Mn, or O as a constituent element. However, another catalyst may be used as long as it is a material capable of the second two-electron reduction reaction. For example, La in the A site of the perovskite type structure may be partially or fully substituted with another rare earth element or an alkali earth metal element. Mn in the B site of the perovskite type structure may be partially or fully substituted with another 3d transition metal element (Ti, V, Cr, Mn, Fe, Co, Ni). Further, the oxygen reduction reaction layer 12 may further contain a metal catalyst that is formed on carbon as a support and contains Ag as a constituent element. This is because, according to the investigation by the present inventors, Ag promotes the first two-electron reduction reaction. This catalyst may contain an unavoidable impurity or a dopant which does not have adverse effects on the above-described characteristics.

The support carbon is not particularly limited, and examples thereof include carbon black, activated carbon, carbon nanofiber, carbon nanotube, heteroelement-doped carbon, mesoporous carbon, and vapor-grown carbon fiber (VGCF). Carbon having a high geometrical specific surface area and a high electrochemical specific surface area is preferable, and examples thereof include carbons having a specific surface area of 65 $m^2/g$ or higher, for example, Vulcan (specific surface area: 242 $m^2/g$, manufactured by Cabot Corporation), Ketjen black (specific surface area: 1320 $m^2/g$, manufactured by Lion Corporation), and C65 (specific surface area: 65 $m^2/g$, manufactured by Timcal Ltd.).

It is preferable that the oxygen reduction reaction layer 12 is hydrophobized, that is, is hydrophobic. When the oxygen reduction reaction layer 12 is hydrophobized, oxygen in the gas phase used in the discharge reaction of the oxygen reduction reaction layer 12 can be efficiently supplied from the outside into the oxygen reduction reaction layer 12. Further, oxygen in the gas phase produced in the charge reaction of the oxygen evolution reaction layer 11 can be efficiently released from the oxygen reduction reaction layer 12 to the outside. As a result, output characteristics of the air battery X can be improved. Further, an electrolytic solution as the electrolyte 3 can be prevented from leaking to the outside through the air electrode 1. A method of hydrophobizing the oxygen reduction reaction layer 12 is not particularly limited, and examples thereof include a method of introducing a hydrophobic binder or the like into a material of the oxygen reduction reaction layer 12.

The current collector 10 is an electrode which receives electrons from the oxygen evolution reaction layer 11 and the oxygen reduction reaction layer 12 and supplies electrons thereto during charging and discharging. The current collector 10 is provided between the oxygen evolution reaction layer 11 and the oxygen reduction reaction layer 12 or in the oxygen evolution reaction layer 11. Since the current collector 10 is arranged as described above, during charging, electrons flow in order through a wiring 6, the negative electrode 2, the electrolyte 3, the oxygen evolution reaction layer 11, the current collector 10, and the wiring 6; and does not flow to the oxygen reduction reaction layer 12. As a result, since an oxidation potential is not applied to the oxygen reduction reaction layer 12 (containing carbon), the oxidative deterioration of the oxygen reduction reaction layer 12 can be suppressed.

As the current collector 10, a support which can function as an air electrode of an air battery having oxygen permeability, electron conductivity, and the like can be used, and examples thereof include: porous materials such as metal foam, metal mesh, and carbon paper; and anion electrolyte membranes. Examples of the metal material include stainless steel, aluminum, nickel, iron, and titanium.

It is preferable that the air electrode 1 further includes a hydrophilic film 13 that is formed on a surface on the electrolyte 3 side of the oxygen evolution reaction layer 11 and allows permeation of water and ions. The hydrophilic film 13 functions to prevent oxygen, which is produced in the oxygen evolution reaction layer 11 during charging, from approaching the hydrophilic film side, that is, the electrolyte side. Accordingly, produced oxygen can be efficiently pushed out to the oxygen reduction reaction layer side. As a result, oxygen pushed out to the oxygen reduction reaction layer 12 can be efficiently released from the oxygen reduction reaction layer 12 to the outside of the air battery X. In other words, the formation of a gas pocket in which produced oxygen continuously remains in the electrolyte 3 can be prevented. On the other hand, if the hydrophilic film 13 is not present, oxygen produced in the oxygen evolution reaction layer 11 moves not only to the oxygen reduction reaction layer side but also to the electrolyte side and enters into the electrolyte 3, and may reach the negative electrode 2. As a result, due to oxygen, the negative electrode 2 is oxidized, that is, the air battery X is self-discharged. Accordingly, by providing the hydrophilic film 13, the movement of oxygen to the negative electrode 2 can be suppressed, that is, the self-discharge of the air battery X can be suppressed.

Examples of the hydrophilic film 13 include: ceramics such as $ZrO_2$ and SiC; hydrophilized resins such as polytetrafluoroethylene (PTFE) and ethyl-ethoxypropionate (EEP); and alloys of nickel, stainless steel, and silver. It is preferable that the hydrophilic film 13 is porous from the viewpoint of allowing permeation of water and ions.

It is preferable that the air battery X includes a pressing member 4 that is provided between the negative electrode 2 and the hydrophilic film 13 to press the hydrophilic film 13 toward a surface of the oxygen evolution reaction layer 11. The pressing member 4 presses the hydrophilic film 13 to the surface of the oxygen evolution reaction layer 11 so as to be compressed and adhered thereto. As a result, the peeling of the hydrophilic film 13 from the oxygen evolution reaction layer 11 due to the force of produced oxygen can be prevented. Accordingly, the function of the hydrophilic film 13 which prevents oxygen from approaching the electrolyte side can be stably exhibited.

Examples of the pressing member 4 include an elastic material which is provided between the negative electrode 2 and the hydrophilic film 13. Examples of the elastic material include an expanded metal, an expanded mesh, and a spring which are formed of metal such as nickel, stainless steel, and titanium.

Here, the adhesion of the oxygen evolution reaction layer 11 through the hydrophilic film 13 has been described as an example. However, the hydrophilic film 13 adhered to the oxygen evolution reaction layer 11 through a separator (not shown) may be directly adhered to the negative electrode 2. In this case, the hydrophilic film 13 may be provided on a surface of the separator.

It is preferable that the air electrode 1 further includes a hydrophobic film 14 that is formed on a surface on the air side of the oxygen reduction reaction layer 12 and allows permeation of oxygen. Even if the air electrode 1 is damaged, the hydrophobic film 14 functions to prevent the electrolytic solution as the electrolyte 3 from leaking from the air electrode 1 to the outside.

Examples of the hydrophobic film 14 include: hydrophobized carbon paper; and porous films such as polyester and polyphenylene sulfide. For example, the carbon paper can be joined to the oxygen reduction reaction layer 12 by pressure bonding.

In a method of manufacturing the air electrode 1, first, one of catalyst powder for the oxygen evolution reaction layer 11 and catalyst powder for the oxygen reduction reaction layer 12 is physically mixed with a binder. Next, a slurry containing the obtained mixture is applied to one side surface of the current collector 10 using an arbitrary application method, is dried, and is optionally rolled. Next, the other one of catalyst powder for the oxygen evolution reaction layer 11 and catalyst powder for the oxygen reduction reaction layer 12 is physically mixed with a binder. Next, a slurry containing the obtained mixture is applied to the other one side surface of the current collector 10 using an arbitrary application method, is dried, and is optionally rolled. Using the above-described method, the air electrode 1 can be formed.

The binder is not particularly limited, and an ion conductive polymer such as polytetrafluoroethylene (PTFE) or polyvinylidene fluoride (PVDF) is preferably used. Examples of the method of applying the slurry to the current collector 10 include a dip coating method, a spray coating method, a roll coating method, a doctor blade method, a gravure coating method, and a screen printing method.

The negative electrode 2 may include a negative electrode active material and a negative electrode current collector. As the negative electrode active material, for example, a metal material, an alloy material, or a carbon material can be used. Specific examples of the negative electrode active material include: alkali metals such as lithium, sodium, or potassium; alkali earth metals such as magnesium or calcium; Group 13 elements such as aluminum; transition metals such as zinc, iron, nickel, titanium, or silver; platinum group elements such as platinum; (alloy) materials containing the above-described metals; and carbon materials such as graphite. Further, a negative electrode material used in a lithium ion battery or the like can be used. In particular, examples of a material containing metal capable of efficient charging and discharging include: hydrogen storage alloys such as an $AB_5$ type rare earth element alloy (for example, $LaNi_5$) or an BCC alloy (for example, Ti-V); and metals such as platinum, zinc, iron, aluminum, magnesium, lithium, sodium, and cadmium. In particular, zinc is preferable. Examples of the negative electrode current collector include copper, stainless steel, aluminum, nickel, iron, titanium, and carbon. For example, the negative electrode current collector may have a foil shape, a plate shape, or a mesh shape.

For example, when the negative electrode active material is particulate, the negative electrode may further contain a conductive additive and/or a binder. As the conductive additive and the binder, the same materials as those of the support carbon and the binder of the air electrode 1 may be used.

The electrolyte 3 allows ion conduction between the air electrode and the negative electrode and may be a liquid electrolyte, a solid electrolyte, a gel electrolyte, a polymer electrolyte, or a combination thereof. As the liquid electrolyte and the gel electrolyte, an aqueous electrolytic solution can be used.

Examples of the aqueous electrolytic solution include an alkaline aqueous solution and an acid aqueous solution, and the aqueous electrolytic solution can be appropriately selected according to the kind of the negative electrode active material. Examples of the alkaline aqueous solution include a potassium hydroxide aqueous solution and a sodium hydroxide aqueous solution. Examples of the acid aqueous solution include a hydrochloric acid aqueous solution, a nitric acid aqueous solution, and a sulfuric acid aqueous solution. Among these, as the aqueous electrolytic solution, a high alkaline aqueous solution is preferable. For example, 8 M KOH may be used.

In the air battery X, a separator (not shown) may be used as another component. The separator may be arranged between the air electrode 1 and the negative electrode 2. Examples of the material of the separator include a porous film of polyethylene or polypropylene. The separator may have a single-layer structure or a multi-layer structure. The hydrophilic film 13 formed of $ZrO_2$ may be formed on one surface of the separator and joined to the oxygen evolution reaction layer 11.

The battery case 5 of the air battery X may be formed of a material which is usually used as that of a battery case of an air battery, for example, a metal can, a resin, or a laminate pack. In the battery case 5, a hole for supplying oxygen can be provided at a position on the air side of the oxygen reduction reaction layer 12 or on the hydrophobic film 14 side thereof.

The negative electrode 2 and the air electrode 1 are connected to an external device 8 through the wiring 6. During charging, the external device 8 functions as a charging device which applies a charging voltage between the air electrode 1 and the negative electrode 2 to charge the air battery X. On the other hand, during discharging, the external device 8 functions as a load which receives the supply of power from the air battery X.

As described above, in the present air battery X, an oxidation potential is not applied to the oxygen reduction reaction layer 12 in the charge reaction (oxygen evolution reaction) of the air battery X. As a result, the oxidation decomposition of the oxygen reduction reaction layer 12 can be suppressed. By efficiently releasing oxygen, produced in the charge reaction, to the outside, the formation of a gas pocket can be suppressed, and the transfer of $OH^-$ to the oxygen evolution reaction layer 11 can be prevented from being inhibited by oxygen bubbles. Further, since the oxygen reduction reaction layer 12 exhibits high activity in the discharge reaction (oxygen reduction reaction), high output characteristics can be obtained.

Figure 2:
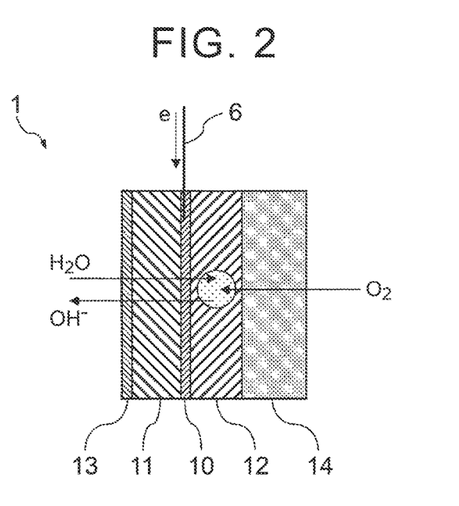
FIG. 2 is a partial sectional view showing a state of an air electrode during a discharge reaction of the air battery according to the embodiment.
Figure 3:
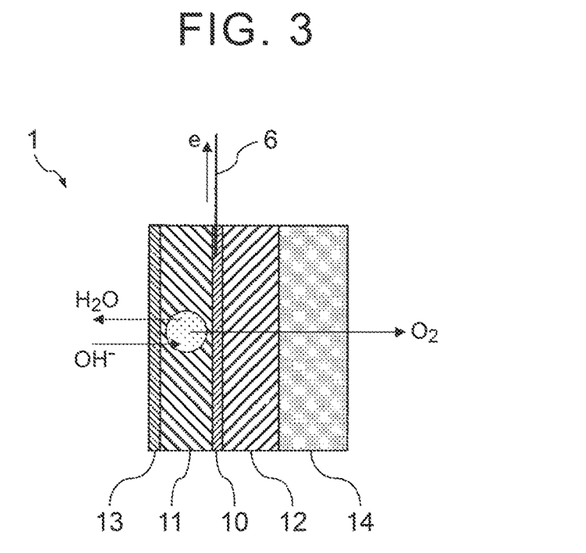
FIG. 3 is a partial sectional view showing a state of the air electrode during a charge reaction of the air battery according to the embodiment.

Next, the operation of the air battery X according to the embodiment will be described. FIGS. 2 and 3 are partial sectional views showing states of the air electrode 1 during the charge reaction and the discharge reaction of the air battery X, respectively.

Referring to FIG. 2, oxygen is necessary in the discharge reaction, that is, in the oxygen reduction reaction ($O_2$+ $2H_2O+4e^- \rightarrow 4OH^-$). Therefore, the oxygen reduction reaction layer 12 that mainly carries the oxygen reduction reaction is provided on the air side of the air electrode 1. As a result, the oxygen reduction reaction can be caused to occur mainly in the oxygen reduction reaction layer 12 due to oxygen supplied from the air side. As the oxygen reduction reaction layer 12, a carbon-supported catalyst having high oxygen reduction reaction activity is used.

At this time, when the oxygen reduction reaction layer 12 is hydrophobized, water of the electrolyte 3 is not likely to penetrate into the oxygen reduction reaction layer 12. Therefore, oxygen of air in the gas phase can easily reach the catalyst in the oxygen reduction reaction layer 12 from the outside. In addition, when the hydrophobic film 14 is used on the surface of the oxygen reduction reaction layer 12, water in air is not likely to be condensed on the surface. Therefore, oxygen in air can easily reach the catalyst in the oxygen reduction reaction layer 12. Further, when the oxygen evolution reaction layer 11 is hydrophilized, water of the electrolyte 3 can be efficiently supplied to the oxygen reduction reaction layer 12 through the oxygen evolution reaction layer 11. With the above-described configurations, the oxygen reduction reaction can be more efficiently promoted.

Referring to FIG. 3, $OH^-$ is necessary in the charge reaction, that is, the oxygen evolution reaction ($4OH^- \rightarrow O_2$+ $2H_2O+4e^-$). Therefore, the oxygen evolution reaction layer 11 that mainly carries the oxygen evolution reaction is provided on the electrolyte side of the air electrode 1. As a result, the oxygen evolution reaction can be caused to occur mainly in the oxygen evolution reaction layer 11 due to $OH^-$ supplied from the electrolyte side. As the oxygen evolution reaction layer 11, a catalyst containing no carbon which has high oxygen evolution reaction activity is used. By using the catalyst containing no carbon, a charging voltage is applied through the current collector 10. In addition, even in the progress of the oxygen evolution reaction (oxidation reaction), carbon is not decomposed by a reaction intermediate during the oxidation reaction and does not deteriorate due to an oxidation potential. Therefore, the reaction can be stably continued. The charging voltage applied through the current collector 10 is applied to the negative electrode 2 and the oxygen evolution reaction layer 11 on the electrolyte side but is not applied to the oxygen reduction reaction layer 12 on the air side. Accordingly, even when the oxygen reduction reaction layer 12 contains carbon which is likely to be oxidized and decomposed, carbon is not oxidized and decomposed.

At this time, when the oxygen evolution reaction layer 11 is hydrophilized, water of the electrolyte 3 is likely to penetrate into the oxygen evolution reaction layer 11. Therefore, $OH^-$ in the electrolytic solution can be efficiently transferred into the oxygen evolution reaction layer 11. When the hydrophilic film 13 is used, oxygen produced in the oxygen evolution reaction layer 11 can be efficiently pushed out to the oxygen reduction reaction layer side, and pushed oxygen can be efficiently released to the outside of the air battery X. Further, when the oxygen reduction reaction layer 12 is hydrophobized, oxygen in the gas phase produced in the oxygen evolution reaction layer 11 can be efficiently released from the oxygen reduction reaction layer 12 to the outside of the air battery X. With the above-described configurations, the oxygen evolution reaction can be further promoted.

In this way, the discharge reaction occurs in the oxygen reduction reaction layer 12 (FIG. 2), and the charge reaction occurs in the oxygen evolution reaction layer 11 (FIG. 3). Therefore, the catalyst material of the oxygen reduction reaction layer 12, in particular, carbon is not oxidized and decomposed, and the charge reaction can be promoted. Further, during discharge, oxygen can be efficiently supplied to the oxygen reduction reaction layer 12, and output can be improved.

Figure 4:
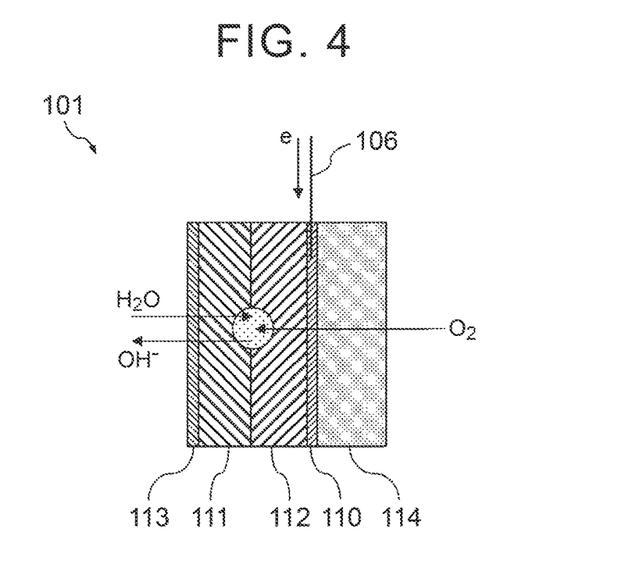
FIG. 4 is a partial sectional view showing a state of an air electrode during a discharge reaction of an air battery according to a comparative example.
Figure 5:
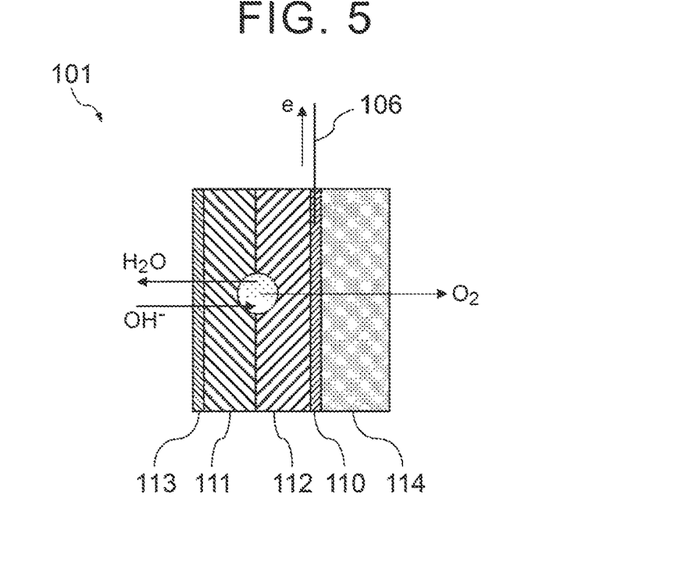
FIG. 5 is a partial sectional view showing a state of the air electrode during a charge reaction of the air battery according to the comparative example.

Next, a charge reaction and a discharge reaction of an air battery according to a comparative example for comparison to the present air battery X will be described. FIGS. 4 and 5 are partial sectional views showing states of an air electrode 101 during the discharge reaction and the charge reaction of the air battery according to the comparative example, respectively. The air electrode 101 includes wiring 106, a hydrophilic film 113, and a hydrophobic film 114. In this case, the air electrode 101 of the air battery according to the comparative example is different from the air electrode 1 (FIGS. 1 to 3), in that a current collector 110 is provided on a side opposite to an electrolyte of the oxygen reduction reaction layer 112, that is, on the air side without being provided between an oxygen evolution reaction layer 111 and the oxygen reduction reaction layer 112 or in the oxygen evolution reaction layer 111.

Referring to FIG. 4, charging and discharging voltages are applied from the position of the current collector 110 to the oxygen reduction reaction layer 112 and the oxygen evolution reaction layer 111, that is, the movement of electrons relating to charging and discharging occurs. As a result, the discharge reaction, that is, the oxygen reduction reaction ($O_2+2H_2O+4e^- \rightarrow 4OH^-$) occurs not only in the oxygen reduction reaction layer 112 but also in the oxygen evolution reaction layer 111 of the air electrode 101. Likewise, referring to FIG. 5, the charge reaction that is, the oxygen evolution reaction ($4OH^- \rightarrow O_2+2H_2O+4e^-$) occurs not only in the oxygen evolution reaction layer 111 but also in the oxygen reduction reaction layer 112 of the air electrode 101. In this way, from the viewpoint of electron conductivity, the charge reaction and the discharge reaction occur at the same positions in the air electrode 101, and both the oxygen evolution reaction layer 111 and the oxygen reduction reaction layer 112 contribute to the charge-discharge reaction. Therefore, during charging, the catalyst material of the oxygen reduction reaction layer 112, in particular, carbon is oxidized and decomposed, the durability deteriorates, and the output also deteriorates.

Figure 6:
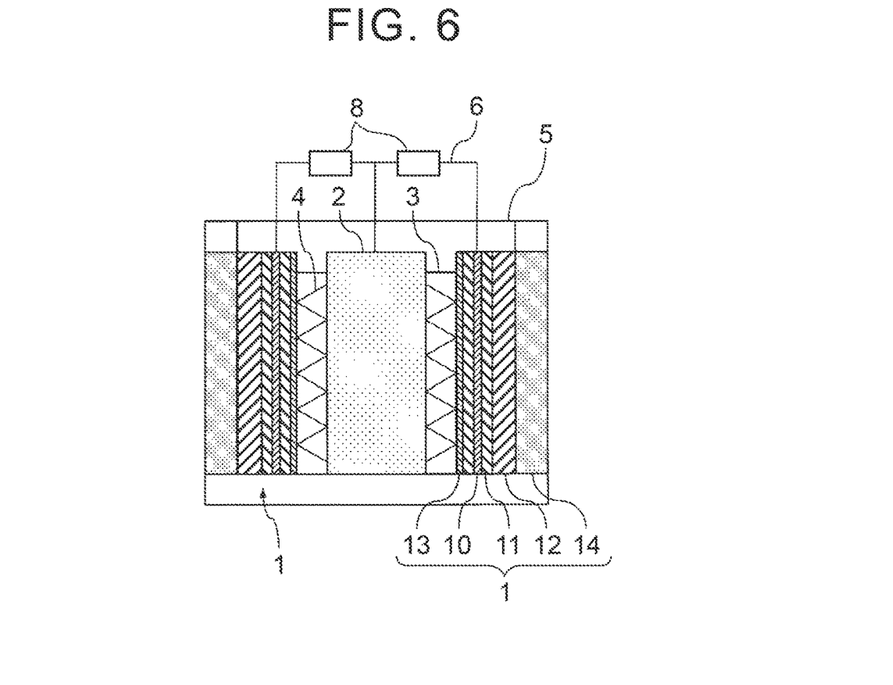
FIG. 6 is a side view schematically showing a configuration of a modification example of the air battery according to the embodiment.

FIG. 6 is a side view schematically showing a configuration of a modification example of the air battery X according to the embodiment. In this modification example, the current collector 10 is provided not between the oxygen evolution reaction layer 11 and the oxygen reduction reaction layer 12 but in the oxygen evolution reaction layer 11. Even in this case, the same effects as in FIG. 1 can be exhibited. For example, the air battery can be favorably charged and discharged, and the oxidation decomposition of carbon in the oxygen reduction reaction layer 12 can be suppressed.

Figure 7:
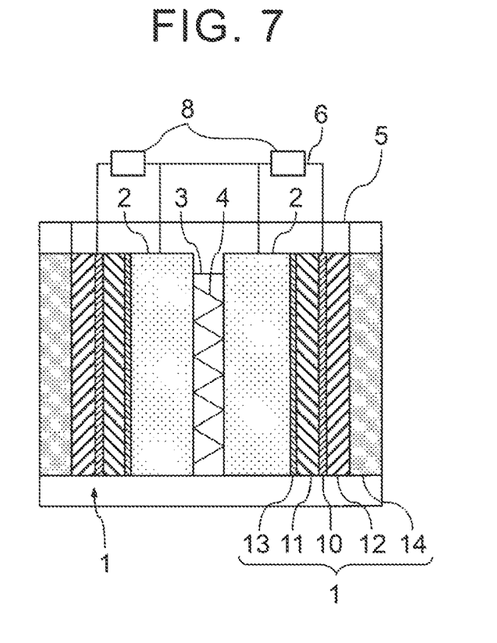
FIG. 7 is a side view schematically showing a configuration of another modification example of the air battery according to the embodiment.

FIG. 7 is a side view schematically showing a configuration of another modification example of the air battery X according to the embodiment. In this modification example, the negative electrode 2 and the air electrode 1 are adhered to each other through the hydrophilic film 13 (and/or the separator (not shown)), and the current collector 10 is provided between the oxygen evolution reaction layer 11 and the oxygen reduction reaction layer 12. Even in this case, the same effects as in FIG. 1 can be exhibited. For example, the air battery can be favorably charged and discharged, and the oxidation decomposition of carbon in the oxygen reduction reaction layer 12 can be suppressed. As shown in FIG. 6, the current collector 10 may be provided in the oxygen evolution reaction layer 11.

Figure 8:
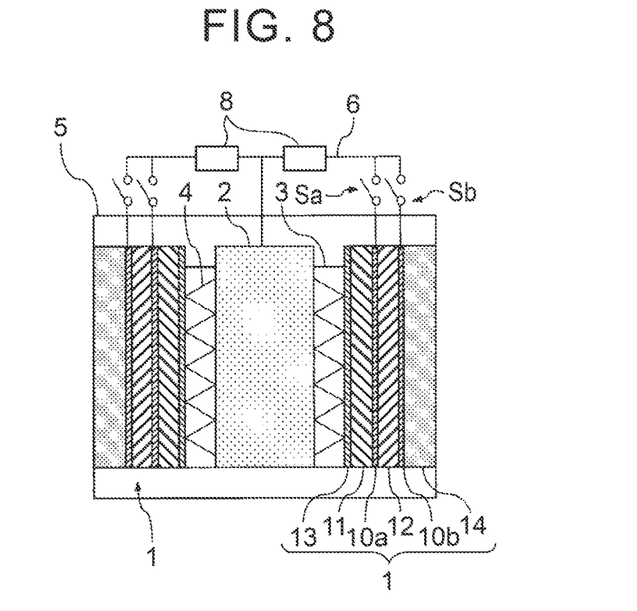
FIG. 8 is a side view schematically showing a configuration of still another modification example of the air battery according to the embodiment.

FIG. 8 is a side view schematically showing a configuration of still another modification example of the air battery X according to the embodiment. In this modification example, a current collector 10a is provided between the oxygen evolution reaction layer 11 and the oxygen reduction reaction layer 12, and a current collector 10b is provided on the opposite side of the oxygen reduction reaction layer 12 from the electrolyte 3. In this case, the current collector 10a is used during charging by switching a switch Sa on, and the current collector 10b is used during discharging by switching a switch Sb on. Even in this case, the same effects as in FIG. 1 can be exhibited. For example, the air battery can be favorably charged and discharged, and the oxidation decomposition of carbon in the oxygen reduction reaction layer 12 can be suppressed.

Hereinafter, an example of the invention will be described. The following example is merely exemplary and does not limit the invention. In each of the following examples, the following device was used for the measurement. Measurement device of charging-discharging characteristics: VMP3 (manufactured by Bio-Logic Science Instruments SAS)

(I) Preparation of Sample

Example (1) Preparation of Air Battery X
(1-1) Air Electrode 1

First, the air electrode 1 was prepared as follows. First, 90.0 mass % of $La_{0.2}Sr_{0.8}Fe_{0.6}Co_{0.4}O_3$ powder as a perovskite type oxide catalyst; and 10.0 mass % of PTFE as a binder were prepared with respect to the mass of the oxygen evolution reaction layer 11. The components were mixed with an appropriate amount of ethanol to obtain a mixture. The obtained mixture was rolled, dried, and cut. As a result, the oxygen evolution reaction layer 11 having a diameter of 20 mm and a thickness of 50 μm was prepared. Next, 45 mass % of $LaMnO_3$ powder as a perovskite type oxide catalyst; 45 mass % of Ketjen black as a support carbon; and 10 mass % of PTFE as a binder were prepared with respect to the mass of the oxygen reduction reaction layer 12. The components were mixed with an appropriate amount of ethanol to obtain a mixture. The obtained mixture was rolled, dried, and cut. As a result, the oxygen reduction reaction layer 12 having a diameter of 20 mm and a thickness of 150 μm was prepared. Next, as the current collector 10, SUS304 100 mesh was used. The oxygen evolution reaction layer 11, the current collector 10, the oxygen reduction reaction layer 12, and carbon paper as the hydrophobic film 14 were laminated in this order, rolled, and dried by heating in a vacuum. As a result the air electrode 1 was prepared.

(1-2) Other Members

As the negative electrode 2, a steel wool having a diameter of 500 μm was used. As the electrolyte 3 (electrolytic solution), 8 mol/L of a potassium hydroxide aqueous solution was used.

(1-3) Air Battery X

The air battery X was prepared with the following method using the above-described members. As the battery case 5, a transparent case whose inside can be observed was used. The air electrode 1 was arranged in the battery case 5 such that the oxygen evolution reaction layer 11 faced the negative electrode 2 and that the hydrophobic film 14 covered an opening of the battery case 5 (a configuration in which the air electrode 1 was provided on only one side of the negative electrode in the air battery X in FIG. 1). Next, the battery case 5 was filled with an electrolytic solution as the electrolyte 3. Next, the battery case 5 was sealed. As a result, the air battery X was obtained.

Comparative Example (1) Preparation of Air Battery

An air battery according to a comparative example was prepared using the same method as in the example of the invention, except that only the catalyst of the oxygen reduction reaction layer 12 was used in the air electrode, that is, the oxygen evolution reaction layer 11 was not used in the air electrode.

(II) Preparation of Sample
(1) Discoloration Evaluation of Electrolytic Solution
(1-1) Evaluation Method The air battery X was charged and discharged plural times, and whether or not the electrolytic solution was discolored by the oxidation decomposition of carbon in the air electrode was determined.

(1-2) Discoloration of Electrolytic Solution
Evaluation Result

The electrolytic solution of the air battery according to the comparative example was transparent before charging and discharging. However, the electrolytic solution was discolored yellow by the oxidation decomposition of carbon after charging and discharging. On the other hand, the electrolytic solution of the air battery of the example of the invention was transparent before charging and discharging and was also transparent without being discolored after charging and discharging.

(2) Evaluation of Electrical Characteristics
(2-1) Evaluation Method

IV characteristics of the air battery X for each electrode were evaluated by using a standard hydrogen electrode as a reference. The battery capacity was evaluated by discharging the air battery X after being charged. The discharge tests were performed using chronopotentiometry under the following IV characteristic evaluation conditions: 3 minutes in a range of 1 mA to 75 mA; and 30 seconds in a range of 100 mA to 400 mA. The discharge evaluation was performed using chronoamperometry under the following discharge evaluation conditions: a current density of 10 mA/cm$^2$.

(2-2) Evaluation Results of Electrical Characteristics

Figure 9:
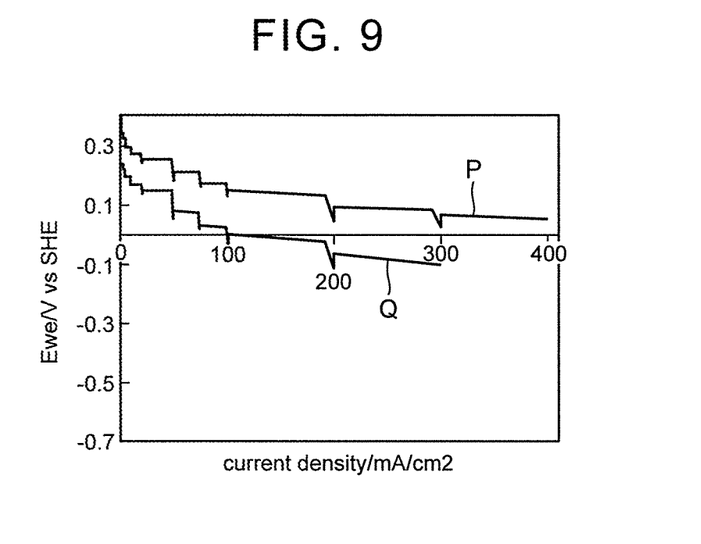
FIG. 9 is a graph showing the results of evaluating IV characteristics of air electrodes of air batteries according to an example of the invention and a comparative example.

FIG. 9 is a graph showing the results of evaluating IV characteristics of air electrodes of air batteries according to an example of the invention and a comparative example. The vertical axis represents the potential of the air electrode using a standard hydrogen electrode as a reference (V vs. SHE). The horizontal axis represents the current flowing through the air electrode and the current density (mA/cm$^2$). The comparative example is indicated by Curve Q, and the example of the invention is indicated by Curve P. As shown in the drawing, the potential of the example of the invention was higher at the same current than that of the comparative example. Therefore, it was determined that overvoltage (internal resistance) was reduced.

Figure 10:
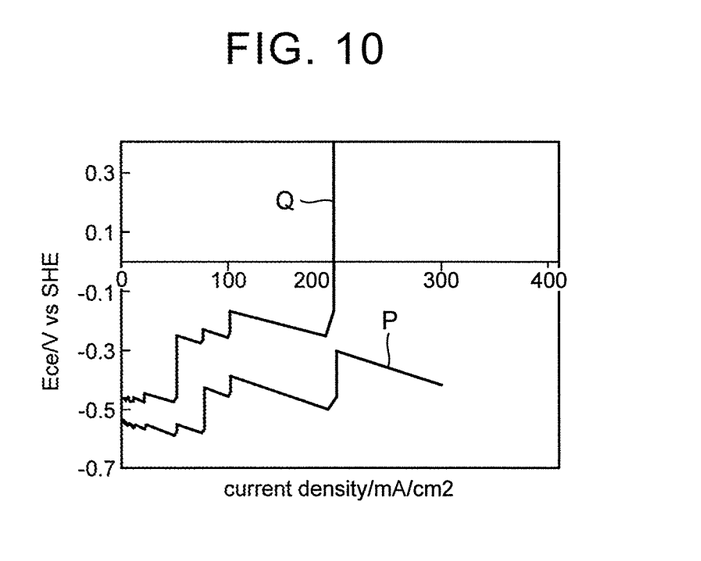
FIG. 10 is a graph showing the results of evaluating IV characteristics of negative electrodes of the air batteries according to the example of the invention and the comparative example.

FIG. 10 is a graph showing the results of evaluating IV characteristics of negative electrodes of the air batteries according to the example of the invention and the comparative example. The vertical axis represents the potential of the negative electrode using a standard hydrogen electrode as a reference (V vs. SHE). The horizontal axis represents the current flowing through the air electrode and the current density (mA/cm$^2$). The comparative example is indicated by Curve Q, and the example of the invention is indicated by Curve P. As shown in the drawing, the potential of the example of the invention was lower at the same current than that of the comparative example. Therefore, it was determined that overvoltage (internal resistance) was reduced.

Figure 11:
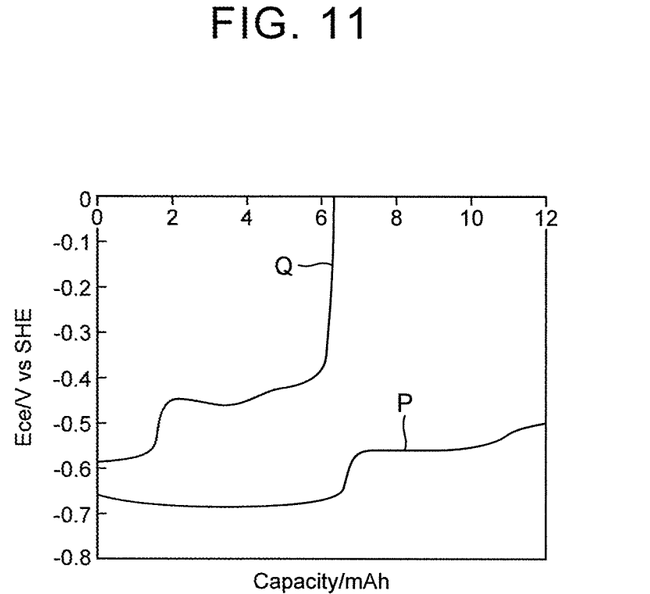
FIG. 11 is a graph showing the results of evaluating the discharge capacity values of the negative electrodes of the air batteries according to the example of the invention and the comparative example.

FIG. 11 is a graph showing the results of evaluating the discharge capacity values of the negative electrodes of the air batteries according to the example of the invention and the comparative example. The vertical axis represents the potential of the negative electrode using a standard hydrogen electrode as a reference (V vs. SHE). The horizontal axis represents the discharge capacity (mAh). The comparative example is indicated by Curve Q, and the example of the invention is indicated by Curve P. As shown in the drawing, the discharge capacity (electric capacity) of the example of the invention was higher than that of the comparative example.

As shown in the above results, it was determined that the output of the air battery of the example of the invention was higher than that of the air battery of the comparative example. The reason for this is presumed that the characteristics of the air electrode of the example of the invention were improved.

What is claimed is:
1. An air battery comprising:
a negative electrode;
an air electrode;
a pressing member; and
an electrolyte that is interposed between the negative electrode and the air electrode, wherein
the air electrode includes:
an oxygen evolution reaction layer for charging that is provided on an electrolyte side of the air electrode and contains an oxygen evolution reaction catalyst containing no carbon,
an oxygen reduction reaction layer for discharging that is provided on an opposite side of the air electrode from the electrolyte and contains an oxygen reduction reaction catalyst containing carbon,
a hydrophilic film that is provided on a surface on the electrolyte side of the oxygen evolution reaction layer and allows permeation of water and ions, and
a current collector that is provided between the oxygen evolution reaction layer and the oxygen reduction reaction layer or in the oxygen evolution reaction layer,
wherein the pressing member is provided between the negative electrode and the hydrophilic film to press the hydrophilic film toward the surface of the oxygen evolution reaction layer.
2. The air battery according to claim 1, wherein
the oxygen evolution reaction layer is hydrophilic.
3. The air battery according to claim 1, wherein
the oxygen reduction reaction layer is hydrophobic.
4. The air battery according to claim 1, wherein
the air electrode further includes a hydrophobic film that allows permeation of oxygen and is provided on a surface of the oxygen reduction reaction layer, the surface being on an opposite side of the oxygen reduction reaction layer from the oxygen evolution reaction layer.
5. The air battery according to claim 1, wherein
the oxygen evolution reaction layer contains a perovskite type oxide $La_{0.2}Sr_{0.8}Fe_{0.6}Co_{0.4}O_3$.
6. The air battery according to claim 1, wherein the oxygen reduction reaction layer contains a perovskite type oxide $LaMnO_3$.

* * * * *